United States Patent
Zimmer et al.

(10) Patent No.: US 7,618,077 B2
(45) Date of Patent: Nov. 17, 2009

(54) WINDSHIELD WIPER DEVICE (75) Inventors: Joachim Zimmer, Sasbach (DE); Gerard Albrecht, Hatten (FR); Juergen Rapp, Lauf (DE); Francois Schabanel, Saint Maur des Fosses (FR); Tino Boos, Baden-Baden (DE); Nicolas Eschenbrenner, Strasbourg (FR); Frank Porchet, Colombes (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/813,179

(22) PCT Filed: Nov. 2, 2005

(86) PCT No.: PCT/EP2005/055699

§ 371 (c)(1), (2), (4) Date: Sep. 6, 2007

(87) PCT Pub. No.: WO2006/072486

PCT Pub. Date: Jul. 13, 2006

(65) Prior Publication Data
US 2008/0092319 A1    Apr. 24, 2008

(30) Foreign Application Priority Data
Dec. 29, 2004   (DE) ................. 10 2004 063 179

(51) Int. Cl.
B60J 1/02    (2006.01)
(52) U.S. Cl. .................. 296/96.7; 296/96.15
(58) Field of Classification Search ............. 296/96.17, 296/96.15, 192
See application file for complete search history.

(56) References Cited

U.S. PATENT DOCUMENTS

| | | | | | |
|---|---|---|---|---|---|
| 1,839,175 | A | * | 12/1931 | Hueber | 15/250.3 |
| 3,784,770 | A | * | 1/1974 | Codrino | 200/61.36 |
| 3,988,574 | A | * | 10/1976 | Peitsmeier | 200/61.27 |
| 4,283,085 | A | * | 8/1981 | Sacco et al. | 296/96.17 |
| 5,142,941 | A | | 9/1992 | Amann et al. | |
| 5,390,391 | A | * | 2/1995 | Zimmer et al. | 15/250.202 |
| 5,567,097 | A | * | 10/1996 | Morin | 411/34 |
| 5,956,800 | A | * | 9/1999 | Morin et al. | 296/96.17 |
| 6,027,157 | A | * | 2/2000 | Epple | 296/96.15 |

(Continued)

FOREIGN PATENT DOCUMENTS

DE    10232877    7/2003

(Continued)

OTHER PUBLICATIONS

International Search Report for PCT/EP2005/055699.

*Primary Examiner*—Kiran B. Patel
(74) *Attorney, Agent, or Firm*—Michael Best & Friedrich LLP (57) ABSTRACT

A windshield wiper device with fastening points (16), by means of which the windshield wiper device is fastened to a body (14) of a motor vehicle. Until now windshield wiper systems were screwed or riveted to the vehicle body so that special tools and a relatively great amount of time are required. The aim of the invention is improving the windshield wiper device so that it can be mounted on the vehicle body more quickly and therefore more cost-effectively. As a result, according to the invention, at least one of the fastening points (16) can move towards the vehicle body (14) for mounting the windshield wiper device.

22 Claims, 8 Drawing Sheets

U.S. PATENT DOCUMENTS

| | | | |
|---|---|---|---|
| 6,254,167 B1 * | 7/2001 | Goto et al. | 296/96.15 |
| 6,378,160 B1 * | 4/2002 | Kakuta et al. | 15/250.3 |
| 6,421,873 B1 | 7/2002 | Zimmer | |
| 6,491,439 B1 * | 12/2002 | Zimmer | 384/295 |
| 6,493,900 B1 * | 12/2002 | Koumo et al. | 296/96.17 |
| 6,554,477 B1 * | 4/2003 | Zimmer | 15/250.31 |
| 6,941,611 B2 * | 9/2005 | Kashiwagi et al. | 15/250.31 |
| 6,976,285 B1 * | 12/2005 | Scholl et al. | 15/250.31 |
| 7,281,293 B2 * | 10/2007 | Zimmer | 15/250.31 |
| 2003/0106179 A1 * | 6/2003 | Kashiwagi et al. | 296/96.17 |
| 2005/0150072 A1 * | 7/2005 | Weiler et al. | 15/250.31 |
| 2006/0242782 A1 * | 11/2006 | Weiler et al. | 15/250.31 |
| 2007/0251043 A1 * | 11/2007 | Benner | 15/250.001 |
| 2007/0289080 A1 * | 12/2007 | Barlas | 15/250.34 |
| 2007/0289081 A1 * | 12/2007 | Kraus et al. | 15/250.34 |
| 2007/0290520 A1 * | 12/2007 | Rapp et al. | 296/96.15 |
| 2008/0022476 A1 * | 1/2008 | Kraus et al. | 15/250.32 |
| 2008/0092319 A1 * | 4/2008 | Zimmer et al. | 15/250.31 |

FOREIGN PATENT DOCUMENTS

| | | |
|---|---|---|
| DE | 10301900 | 7/2004 |
| DE | 10325736 | 12/2004 |
| EP | 0952053 | 10/1999 |
| EP | 0963890 | 12/1999 |
| EP | 1197405 | 4/2002 |
| FR | 2848515 | 6/2004 |
| FR | 2855488 | 12/2004 |

* cited by examiner

WINDSHIELD WIPER DEVICE

BACKGROUND OF THE INVENTION

The invention relates to a windshield wiper device with fastening points, by means of which the windshield wiper device is fastened to a body of a motor vehicle.

SUMMARY OF THE INVENTION

Until now windshield wiper systems were screwed or riveted to the vehicle body. Special tools were required for screwing or riveting. In addition, screwing or riveting requires a relatively great amount of time, which increases assembly costs.

The aim of the invention is improving the windshield wiper device of the type cited at the outset such that in the future it can be mounted on the vehicle body more quickly and therefore more cost-effectively.

The invention attains the stated aim with a windshield wiper device of the type cited at the outset wherein, according to the invention, at least one of the fastening points can move towards the vehicle body for mounting the windshield wiper device. In this way, the windshield wiper device can be clamped between selected regions of the vehicle body. As a result, in the future, screws, rivets and the like can be eliminated.

In a preferred embodiment, the windshield wiper device can have a movable molded tube that is inserted in areas into a tube relative to the tube, wherein the molded tube can be moved towards the vehicle body with a spring. As a result, the molded tube and at the same time also the windshield wiper device can be fastened to the vehicle body with a few manual manipulations. The spring presses the molded tube against the vehicle body so that it can be mounted quickly and simply and at the same time it remains fastened to the vehicle body even if it experiences shocks.

In addition, the molded tube can be provided with a lock that prevents the molded tube from detaching from the vehicle body, e.g., in the case of shocks.

In a very simple and therefore cost-effective variation, the lock can be a securing ring, which sits on a bolt-like projection of the molded tube that is inserted into the tube and which makes contact with the tube. The securing ring is advantageously placed on the bolt-like projection after the molded tube is mounted on the vehicle body.

Additionally or alternatively, the projection of the molded tube that is inserted into the tube can be provided with teeth. The teeth increase the friction between the bolt-like projection that is inserted into the tube and the inner surface of the tube. The teeth are therefore a structural measure in order to reliably secure the molded tube on the vehicle body after mounting.

A securing pin can be detachably inserted into the molded tube and the tube. Consequently, the arrangement of the molded tube and the tube with the pre-tensioned spring can be delivered for mounting so that the assembly personnel only has to pull the securing pin out of the molded tube and the tube for mounting and then the spring moves the molded tube towards the vehicle body.

The fastening point can be arranged on the molded tube and can be inserted into the vehicle body. As a result, the windshield wiper device can be fastened to the vehicle body via the molded tube.

In another embodiment, the molded tube can have two sections that are connected to an articulation, wherein the one section can be displaced into a guide tube, and the molded tube is bent at the articulation before it is mounted on the vehicle body. This embodiment variant can also be mounted easily without a spring by the assembly personnel positioning the fastening point that can be inserted into the vehicle body in front of the opening located in the vehicle body and then pressing on the articulation forming the bend thereby sliding the fastening point into the opening located in the vehicle body.

So that the molded tube cannot detach unintentionally from the vehicle body after mounting has taken place, the articulation can be locked.

The lock can be realized structurally very simply if the articulation can be locked with a sleeve. The sleeve can be slid over the articulation so that undesired yielding of the articulation and thus an undesired detaching of the molded tube from the vehicle body is ruled out.

So that the sleeve cannot be displaced in the case of shocks, but remains reliably locked over the articulation, the sleeve can have a projecting part, which engages in an indentation on the articulation.

The articulation can be designed very economically if it has a ball-and-socket joint or a hinge.

The hinge can be manufactured cost-effectively in high unit numbers if it is an integral hinge.

In another embodiment, the molded tube can be connected to an extendable tube. Because of the possibility of extending the tube, the molded tube can be moved toward the vehicle body for fastening.

The tube can feature two sections, which are connected to a sleeve that has an internal thread, wherein one of the sections has an external thread that can be screwed together with the internal thread of the sleeve, and the sleeve is arranged rotatably on the other section. Consequently, the tube can be extended by a rotational movement of the sleeve thereby moving the molded tube towards the vehicle body. As a result, the molded tube can be fastened to the vehicle body with a simple manual movement.

In order to arrange the sleeve rotatably on the other section, the other section of the tube can have a circumferential groove in which a projecting part attached to the sleeve engages.

In another alternative embodiment, the molded tube can have at least one pin, which can be inserted into an opening arranged on the vehicle body. As a result, using screws, rivets or the like with the vehicle body can quickly be dispensed with.

So that the windshield wiper device is reliably connected to the vehicle body via the molded tube even in the case of shocks, the at least one pin can have teeth on the end that can be inserted into the opening of the vehicle body.

If the at least one pin can be locked on the molded tube, undesired detachment from the vehicle body, e.g., due to shocks, cannot occur.

For quick and secure mounting, the at least one pin can be moved towards the vehicle body with a lever that can be suspended on the molded tube.

For a better hold of the at least one pin, a rubber part having at least one opening can be provided in the opening of the vehicle body. The pin is inserted into the opening of the rubber part in order to fasten the molded tube to the vehicle body. In particular, if the pin is provided with teeth, it is held especially reliably in the rubber part.

If the rubber part can be positioned on at least one pin before final mounting of the molded tube, the assembly personnel is able to mount the molded tubes that are delivered in this state on the vehicle body more quickly.

BRIEF DESCRIPTION OF THE DRAWINGS

Various exemplary embodiments will be explained in greater detail in the following on the basis of the enclosed drawings.

The drawings show in detail.

DETAILED DESCRIPTION

Figure 1A:
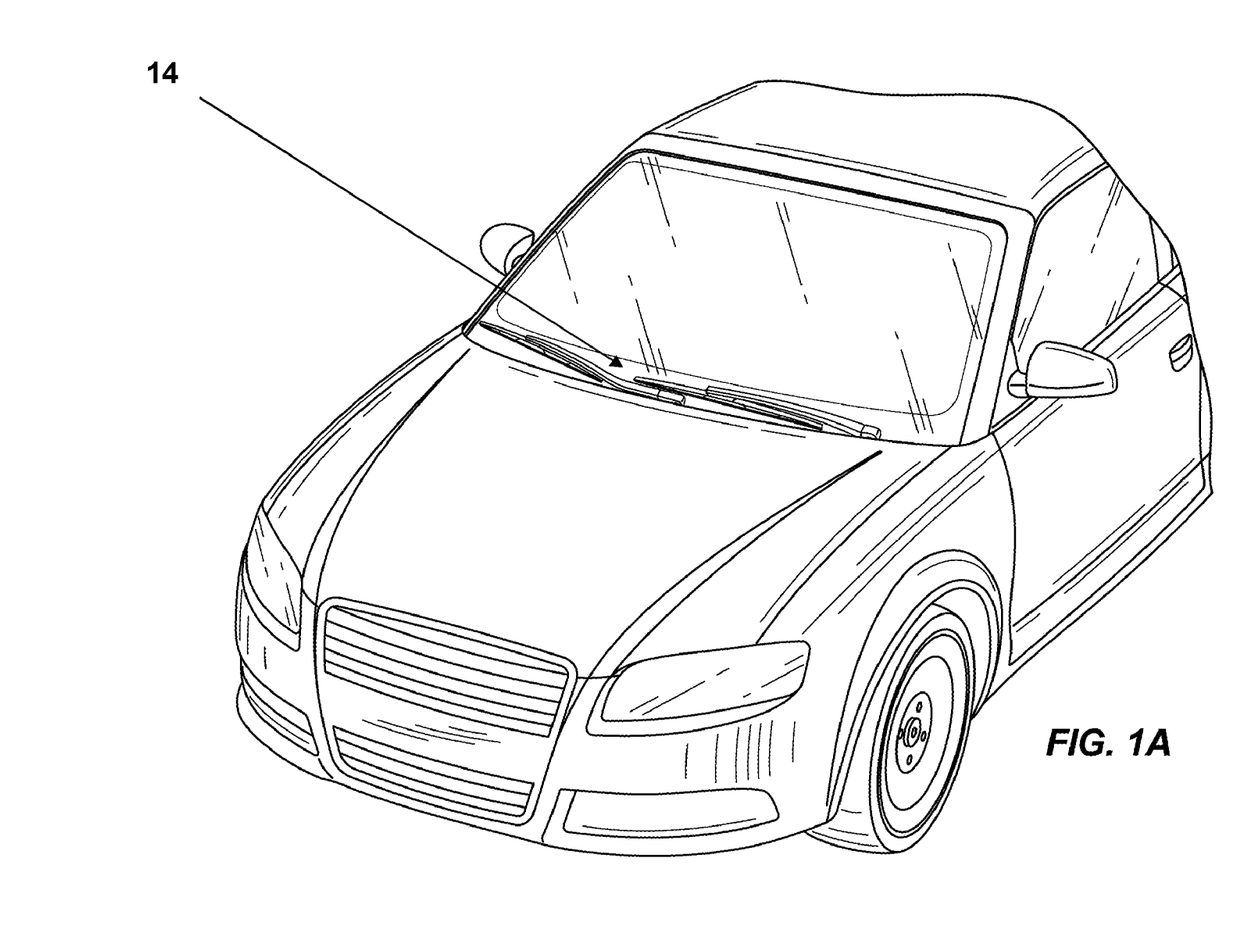
FIG. 1A A perspective view of a motor vehicle including a windshield wiper device.
Figure 1B:
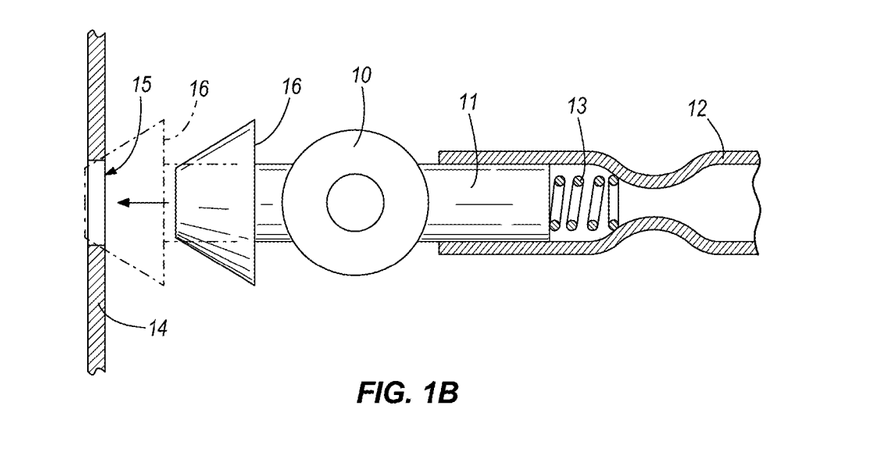
FIG. 1B A sectional view from above of a first embodiment of a molded tube.

FIG. 1A shows a motor vehicle including a vehicle body 14 and a windshield wiper device. FIG. 1B shows a portion of the windshield wiper device which can have a molded tube 10 with a projection 11, which is inserted into a tube 12. The molded tube 10 and the projection 11 can be displaced in the tube 12 relative to it. A spring 13 is arranged on the end of the projection 11, and this spring moves (as indicated by the arrow) the molded tube 10 towards an opening 15 provided in a vehicle body 14.

A fastening point 16, which can be inserted into the opening 15 (as shown in phantom in FIG. 1B), is provided on the molded tube 10. Because of the spring 13, the molded tube 10 can be mounted quickly and simply. In addition, the spring 13 presses the molded tube 10 reliably against the vehicle body 14 even in the case of shocks.

Figure 2:
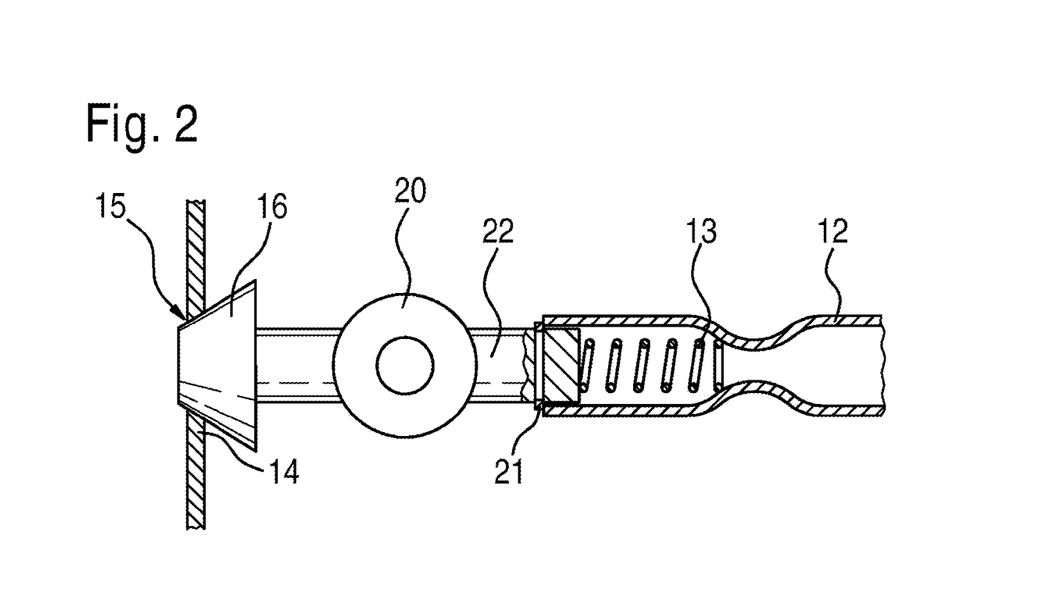
FIG. 2 A sectional view from above of a second embodiment of a molded tube.

In addition to the spring 13, a molded tube 20 can be provided with a securing ring 21 (see FIG. 2), which locks the molded tube 20 when the fastening point 16 is inserted into the opening 15 in the vehicle body 14. The securing ring 21 prevents a projection 22 from being pushed into the tube 12 after final mounting. The securing ring 21 is positioned expediently on the projection 22 after the molded tube 20 is mounted on the vehicle body 14.

Figure 3:
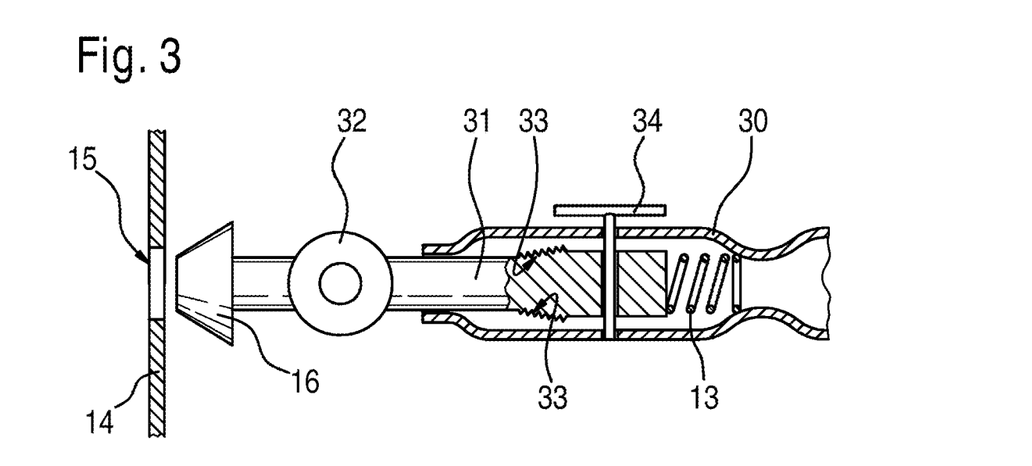
FIG. 3 A sectional view from above of a third embodiment of the molded tube.

A projection 31 of a molded tube 32 that is inserted into a tube 30 can be provided with teeth 33 (see FIG. 3). The teeth 33 increase the friction between the projection 31 and the tube 30. As a result, the molded tube 32 is reliably secured on the vehicle body 14 after mounting.

Figure 4:
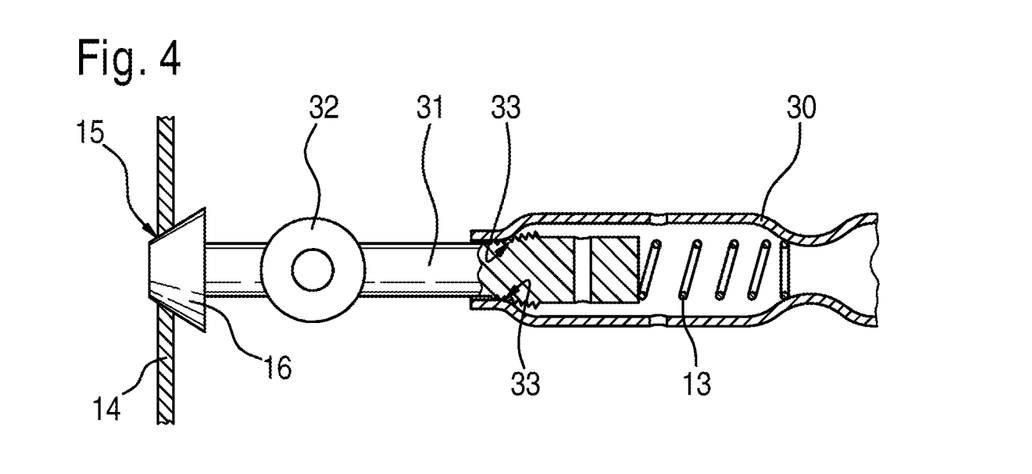
FIG. 4 A sectional view from above of the molded tube from FIG. 3.

A securing pin 34 is detachably inserted into the tube 30 and the molded tube 32. As a result, the pre-mounted arrangement of the tube 30 and the molded tube 32 with the pre-tensioned spring 13 can be delivered for mounting, whereby the assembly personnel only has to pull the securing pin 34 out of the tube 30 and the molded tube 32 for mounting. As soon as the securing pin 34 is pulled out of the tube 30 and the molded tube 32, the spring 13 moves the molded tube 22 towards the vehicle body 14 (see FIG. 4) so that the fastening point 16 is inserted into the opening 15. At the same time, the teeth 33 arc pressed into the inner wall of the tube 30.

Figure 5:
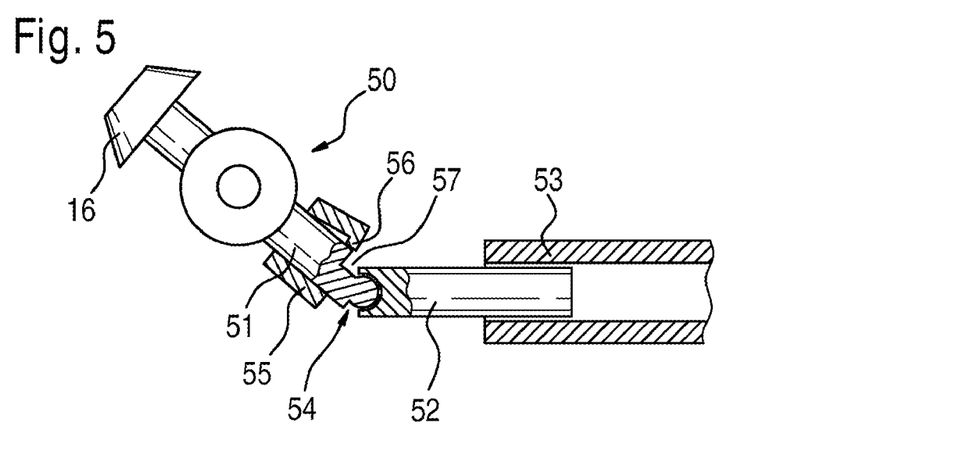
FIG. 5 A sectional view from above of a fifth embodiment of the molded tube.

FIG. 5 shows a molded tube 50, which has sections 51 and 52. The section 52 is arranged displaceably in a guide tube 53. An articulation 54 is provided between the sections 51 and 52. Before final mounting, the molded tube 50 features a bend in the area of the articulation 54. The assembly personnel presses on the articulation 54 forming the bend thereby sliding the fastening point 16 into the opening of the vehicle body.

Figure 6:
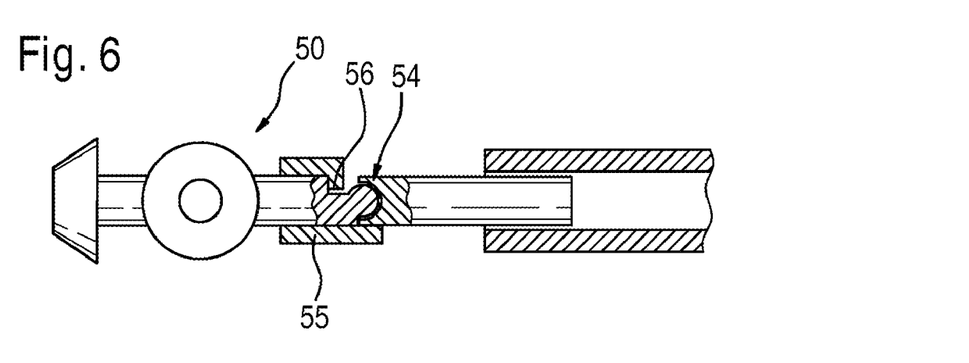
FIG. 6 A sectional view from above of the molded tube from FIG. 5 after final mounting.

So that the molded tube 50 cannot detach unintentionally from the vehicle body after final mounting, the articulation 54 can be locked with a sleeve 55. The sleeve 55 is slid over the articulation 54 for locking (see FIG. 6). So that the sleeve 55 cannot slide down from the articulation 54 in the case of shocks, the sleeve 55 can feature a projecting part 56, which engages in an indentation 57 (see FIGS. 5 and 6).

Figure 7:
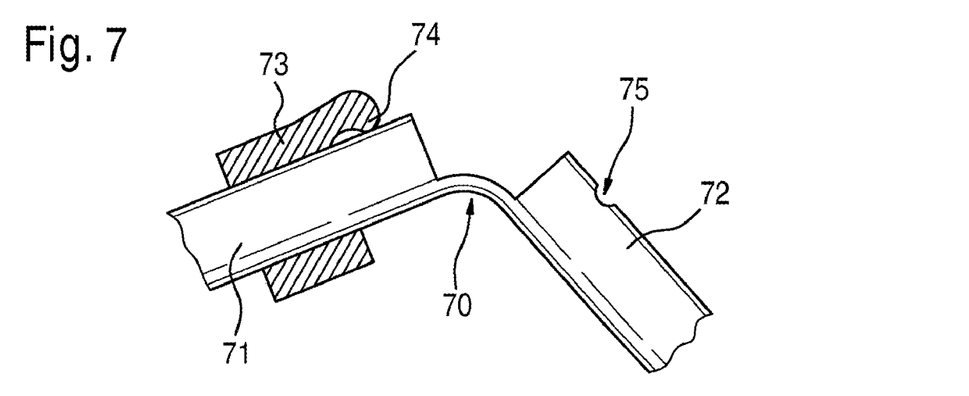
FIG. 7 A detailed view of a variation of an embodiment of an articulation of the molded tube from FIG. 5.
Figure 8:
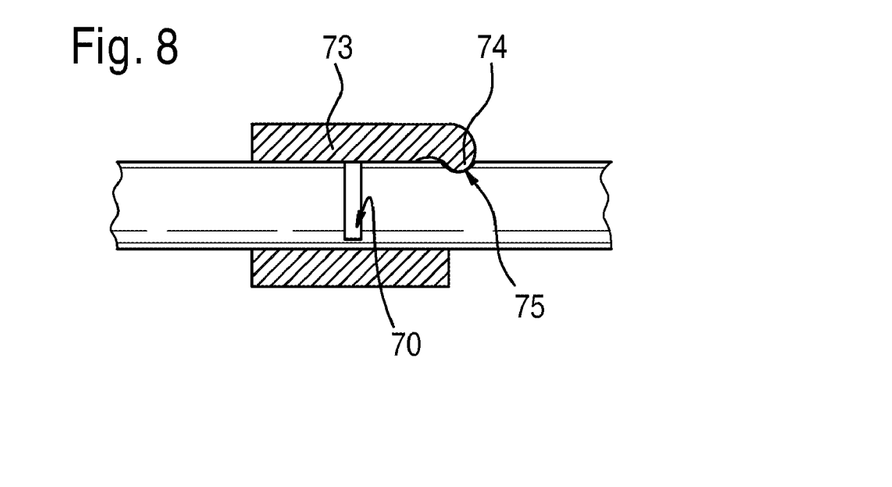
FIG. 8 A detailed view of the articulation from FIG. 7 in a locked state.

The articulation 54 is a ball-and-socket joint. However, it is also possible to provide an integral hinge 70 between sections 71 and 72 (see FIG. 7). In that case, a sleeve 73 features a projecting part 74, which engages in an indentation 75 when the sleeve is slid over the integral hinge 70 (see FIG. 8).

Figure 9:
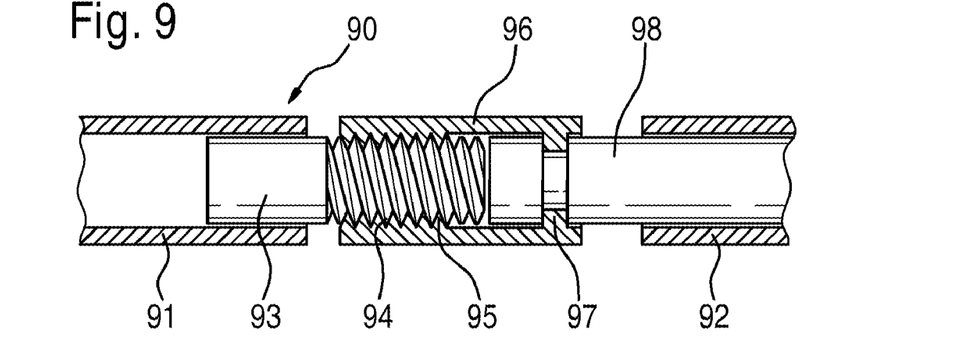
FIG. 9 A section view from the side of an extendable tube.

FIG. 9 shows an extendable tube 90, which has two sections 91 and 92. A molded tube (not shown here in detail) can be connected to the tube 90. The tube 90 is extended (see FIG. 10) in order to fasten the molded tube to the vehicle body (also not shown).

Figure 10:
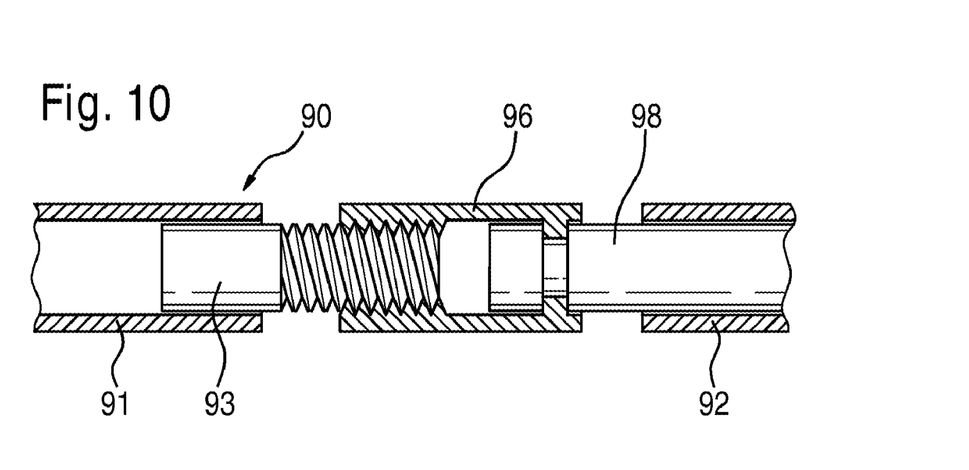
FIG. 10 A sectional view from the side of the tube from FIG. 9 in an extended state.

A bolt 93 having an external thread 94 is inserted into section 91. A sleeve 96 that is provided with an internal thread 95 is screwed onto the external thread 94. The sleeve 96 has a projecting part 97, which engages in a circumferential groove of a bolt 98 inserted into the section 92. As a result, the sleeve 96 is arranged rotatably on the bolt 98 of the section 92 so that the tube 90 can be extended with a simple rotational movement of the sleeve 96.

Figure 11:
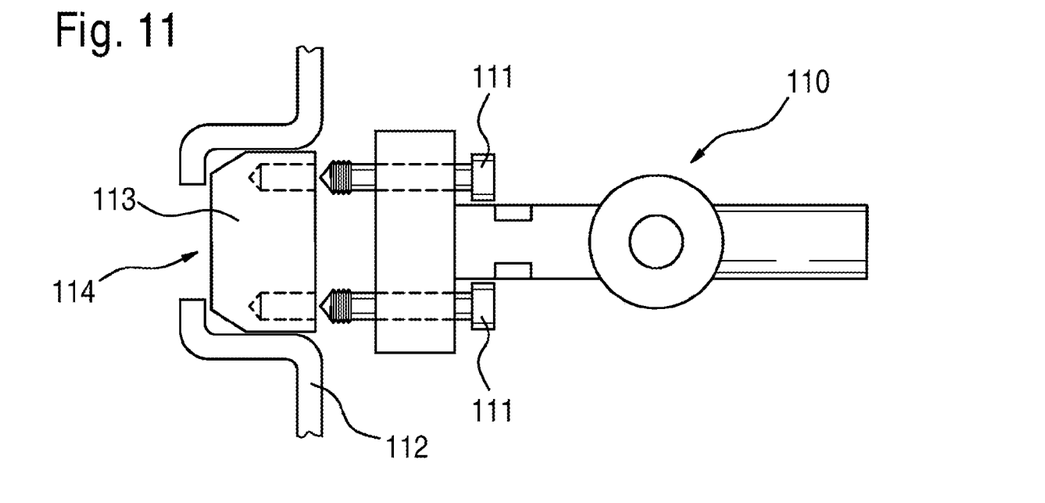
FIG. 11 A top view of a sixth second embodiment of the molded tube.

FIG. 11 shows a molded tube 110, which is provided with pins 111. The pins 111 can be moved towards a vehicle body 112. The pins 111 can be inserted into a rubber part 113 arranged in a vehicle body opening 114.

The pins 111 can be provided with teeth 120 so that they remain reliably locked in the vehicle body 112 even in the case of shocks.

Figure 12:
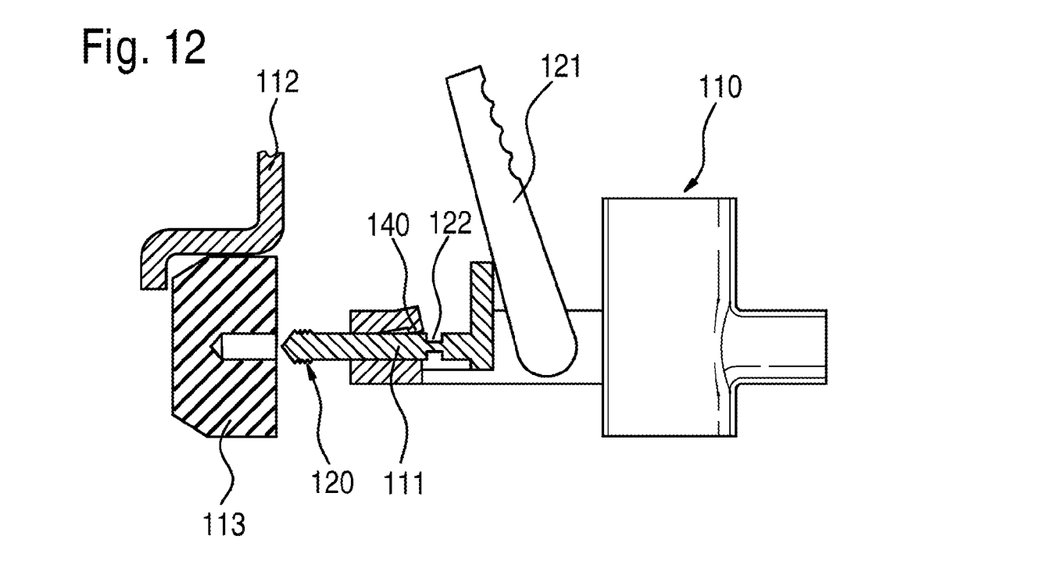
FIG. 12 A side view of the molded tube from FIG. 11 with a lever.

So that the molded tube 110 can be mounted quickly and simply on the vehicle body 112, a lever 121 can be used to press against the pins 111 (see FIG. 12).

Figure 13:
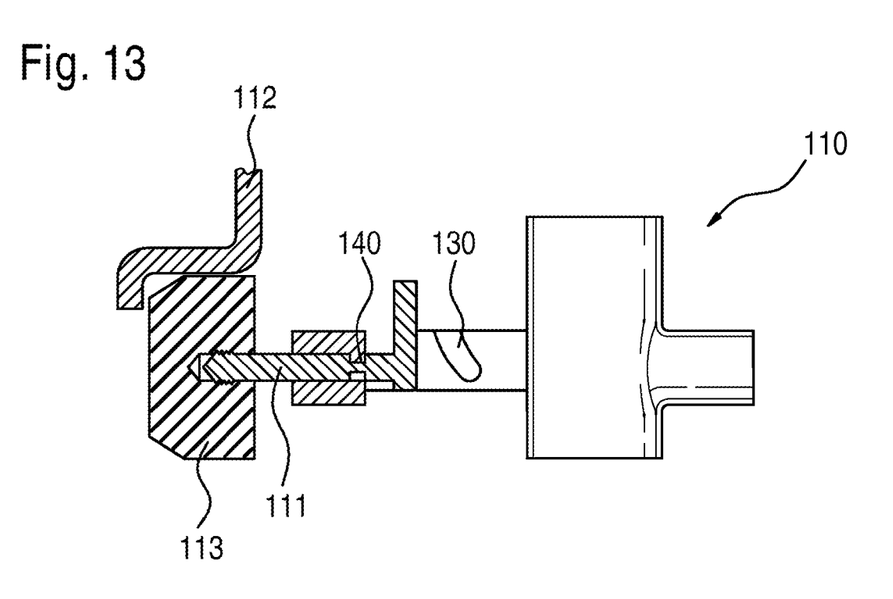
FIG. 13 A side view of the molded tube from FIG. 11 after final mounting.
Figure 14:
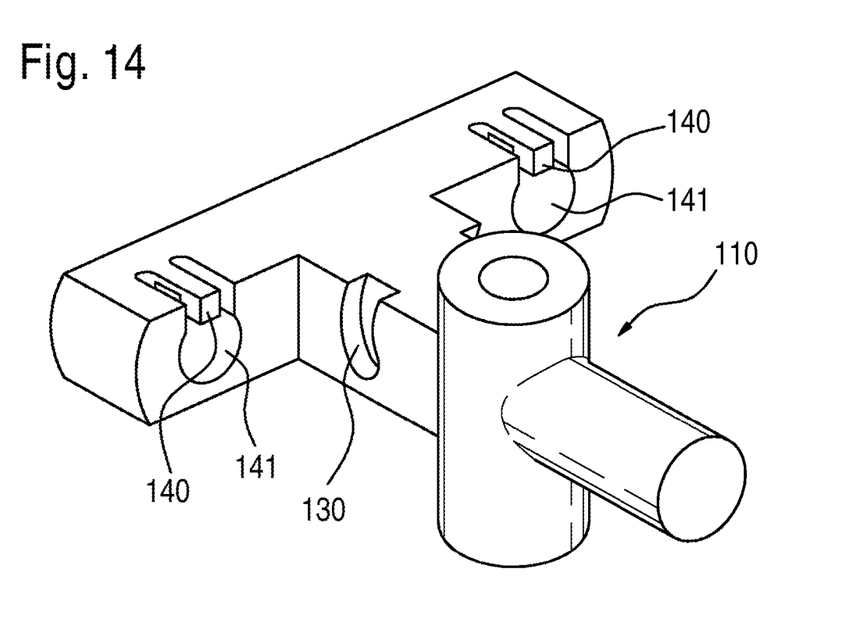
FIG. 14 A perspective view of the molded tube from FIG. 11.

The molded tube 110 is provided with hooks 140 (see FIGS. 12 and 14) and the pins are provided with indentations 122 (see FIG. 12) in order to lock the pins 111 that are inserted into openings 141 (see FIG. 14), after they have been inserted into the rubber part 113 (see FIG. 13).

The molded tube 110 has grooves 130 (see FIGS. 13 and 14), in which the lever 121 can be suspended in order to slide the pins 111 into the rubber part 113.

Figure 15:
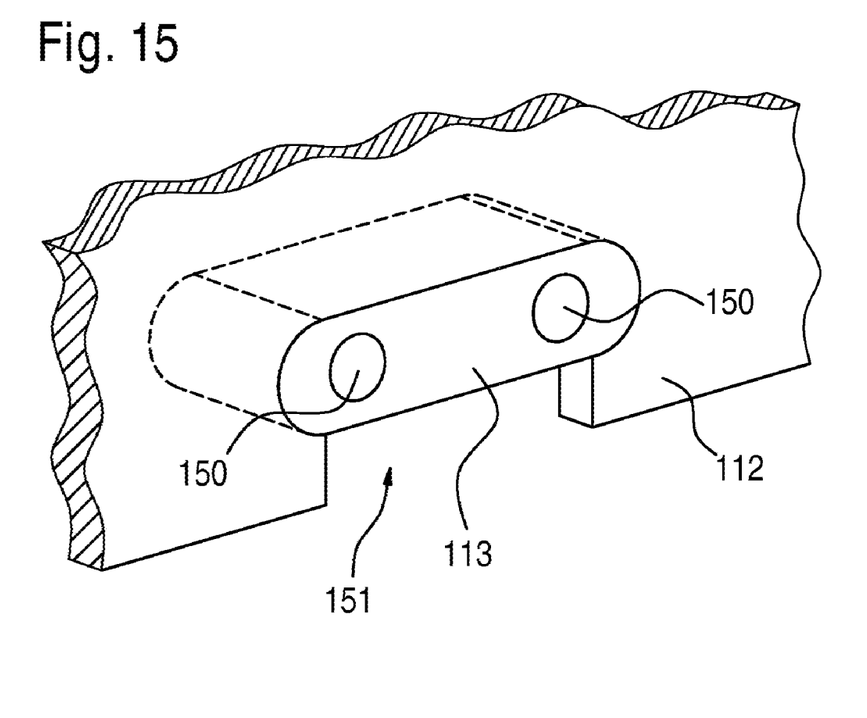
FIG. 15 A perspective view of a rubber part.

The rubber part 113 is provided with openings 150 into which the pins 111 can be inserted. A recess 151 is provided in the vehicle body 112 beneath the rubber part 113. The purpose of the recess 151 is pedestrian impact protection. When there is a pedestrian impact with the windshield wiper device, the rubber part 113 releases from the vehicle body 112, whereby the molded tube 110 also detaches from the vehicle body and therefore avoids impact.

In the case of all the embodiments described, it is possible that they be provided with at least a further fastening point forming an abutment in addition to the fastening point that can move towards the vehicle body.

The invention claimed is:

1. Windshield wiper device with fastening points, by means of which the windshield wiper device is fastened to a vehicle body of a motor vehicle, characterized in that a first structural member is movable relative to a second structural member and relative to the vehicle body, the first structural member including at least one of the fastening points, the at least one of the fastening points being movable with the first structural member relative to the second structural member and towards the vehicle body, the at least one of the fastening points being engagable with the vehicle body for mounting the windshield wiper device on the vehicle body.

2. Windshield wiper device according to claim 1, characterized in that the windshield wiper device has a movable molded tube providing the first structural member that is inserted in areas into a tube providing the second structural member and movable relative to the tube, the at least one of the fastening points being supported on the molded tube, and characterized in that a spring is between the molded tube and the tube, wherein the molded tube is movable towards the vehicle body by the spring such that the at least one of the fastening points engages with the vehicle body.

3. Windshield wiper device according to claim 2, characterized in that the molded tube is provided with a lock.

4. Windshield wiper device according to claim 3, characterized in that the lock is a securing ring.

5. Windshield wiper device according to claim 2, characterized in that a bolt-like projection of the molded tube is inserted into the tube and is provided with teeth.

6. Windshield wiper device according to claim 2, characterized in that a securing pin is detachably inserted into the molded tube and the tube.

7. Windshield wiper device according to claim 2, characterized in that the at least one of the fastening points is arranged on the molded tube and is insertable into an opening in the vehicle body.

8. Windshield wiper device according to claim 1, characterized in that the molded tube has two sections that are connected to an articulation, wherein the one section can be displaced into a guide tube, and the molded tube is bent at the articulation before it is mounted on the vehicle body.

9. Windshield wiper device according to claim 8, characterized in that the articulation can be locked.

10. Windshield wiper device according to claim 9, characterized in that the articulation can be locked with a sleeve.

11. Windshield wiper device according to claim 10, characterized in that the sleeve has a projecting part, which engages in an indentation on the articulation.

12. Windshield wiper device according to claim 8, characterized in that the articulation has a ball-and-socket joint or a hinge.

13. Windshield wiper device according to claim 12, characterized in that the hinge is an integral hinge.

14. Windshield wiper device according to claim 2, characterized in that the molded tube is connected to an extendable tube.

15. Windshield wiper device according to claim 14, characterized in that the tube has two sections, which are connected to a sleeve that has an internal thread, wherein the section has an external thread that can be screwed together with the internal thread of the sleeve, and the sleeve is arranged rotatably on the other section.

16. Windshield wiper device according to claim 15, characterized in that the other section of the tube has a circumferential groove in which a projecting part attached to the sleeve engages.

17. Windshield wiper device according to claim 2, characterized in that the molded tube has at least one pin that can move towards the vehicle body, which pin can be inserted into an opening arranged on the vehicle body.

18. Windshield wiper device according to claim 17, characterized in that the at least one pin has teeth on the end that can be inserted into the opening of the vehicle body.

19. Windshield wiper device according to claim 17, characterized in that the at least one pin can be locked on the molded tube.

20. Windshield wiper device according to claim 17, characterized in that the at least one pin can be moved towards the vehicle body with a lever that can be suspended on the molded tube.

21. Windshield wiper device according to claim 17, characterized in that a rubber part having at least one opening is provided in the opening of the vehicle body.

22. Windshield wiper device according to claim 21, characterized in that the rubber part can be positioned on the at least one pin before final mounting of the molded tube.

* * * * *